Nov. 10, 1964     K. WENGER     3,156,014
INJECTION MOLDING MACHINE
Filed March 21, 1963     2 Sheets-Sheet 1
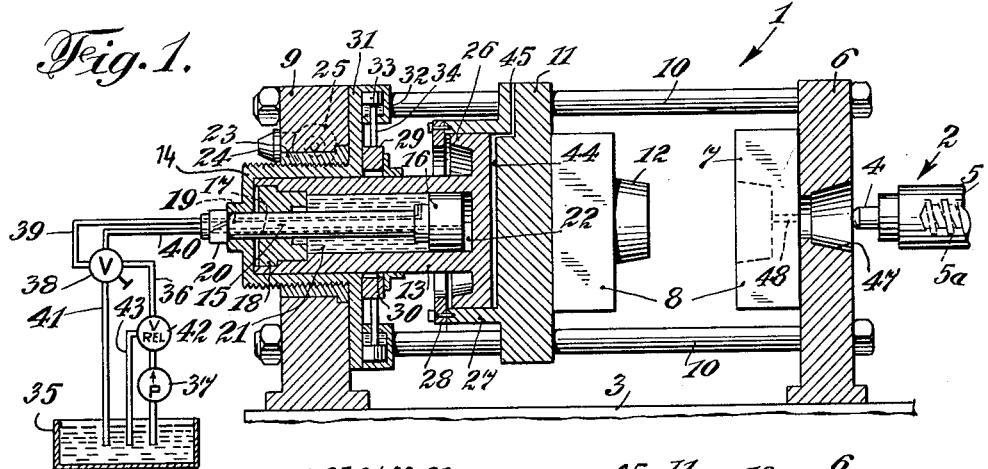
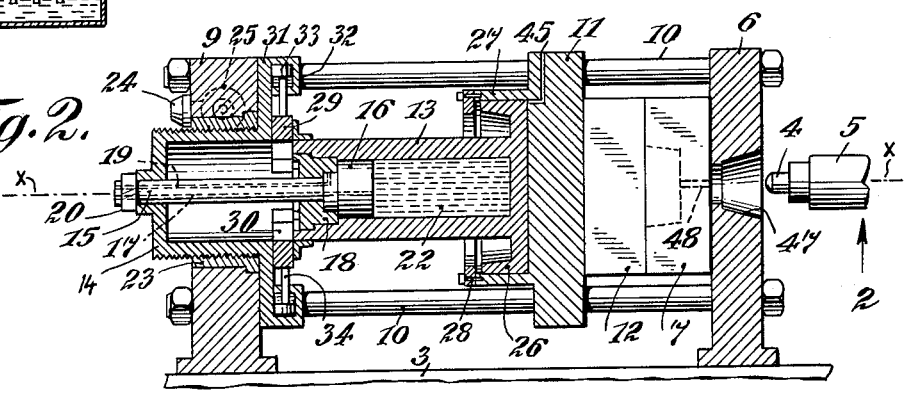
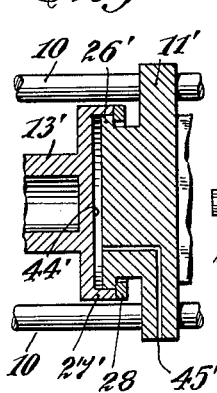
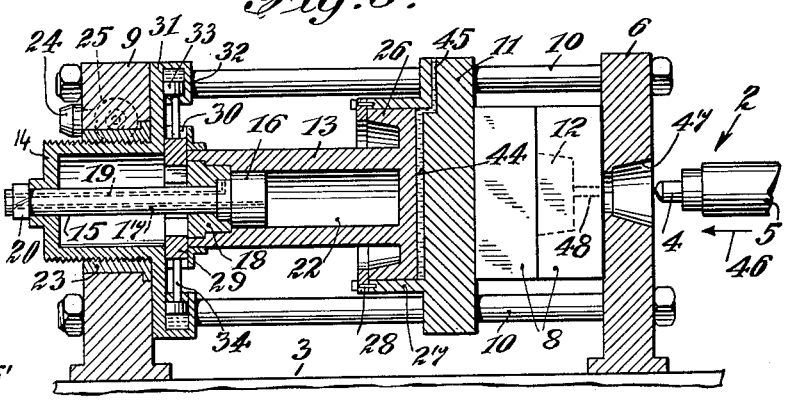
INVENTOR:
*Karl Wenger*
BY Michael S. Striker
*his* ATTORNEY Nov. 10, 1964 K. WENGER 3,156,014
INJECTION MOLDING MACHINE Filed March 21, 1963 2 Sheets-Sheet 2

INVENTOR:
KARL WENGER
BY Michael S. Striker his ATTORNEY

3,156,014
INJECTION MOLDING MACHINE
Karl Wenger, Munich-Untermenzing, Germany, assignor to Krauss-Maffei Aktiengesellschaft, Munich-Allach, Germany
Filed Mar. 21, 1963, Ser. No. 271,833
Claims priority, application Germany, June 6, 1959, K 37,921
6 Claims. (Cl. 18—30)

The present invention relates to injection molding and die casting machines in general, and more particularly to improvements in die closing, locking and sealing means for such machines. The machine of my invention is particularly suited for molding of shaped articles which consist of thermoplastic material but the machine is equally useful for casting of metallic objects.

This is a continuation-in-part of my application Serial No. 31,302, now abandoned.

In conventional injection molding and die casting machines of which I have knowledge at this time, the die closing cylinder is rigidly secured to the front side or to the rear side of a stationary member which is carried by the machine base. The piston in this die closing cylinder is connected with and is adapted to reciprocate a movable platen which carries one of the two half dies. The purpose of the closing cylinder and of the piston is to shift the movable half die into abutment with and away from the stationary half die. The final sealing pressure which prevents flashing of molded synthetic plastic or cast metallic material is supplied by a purely mechanical and/or by a hydraulic system. For example, it is already known to provide on the movable platen one or more spacer bars whose rear ends abut against a Maltese cross-shaped plate turnably mounted on the stationary component of the machine. This plate and the spacer bars take up the stresses which develop during the molding operation and prevent transmission of such stresses to the comparatively weak die closing cylinder. A serious drawback of such molding machines is that they occupy too much space not only because the spacer bars extend rearwardly and beyond the cylinder-supporting stationary component when the movable half die is shifted away from the stationary half die, but also because the piston rod of the die closing cylinder extends well beyond and rearwardly from the stationary component. In addition, and particularly if sealing pressure is generated by a hydraulic system, the sealing cylinder is usually provided within the movable platen which latter must be dimensioned accordingly and occupies space that could be utilized for shifting the movable half die further away from the stationary half die. Moreover, the spacer bars, the Maltese cross-shaped plate and a bulky movable platen add to the overall weight and to the initial cost of such machines.

Purely mechanical die locking and sealing arrangements also present a series of problems, particularly since their parts expand at elevated temperatures and because the actual locking pressure cannot be controlled with sufficient accuracy. For example, certain presently known molding machines utilize locking wedges, threaded spindles and many other types of mechanical locking and sealing means, but such devices cannot always withstand pressures which develop in the course of a molding or casting operation; in addition, they require frequent adjustments and are subjected to considerable wear and tear which adds to the cost of such apparatus.

An important object of the present invention is to provide an injection molding or die casting machine which is of greatly reduced length despite the fact that the movable half die may be shifted to a position at a considerable distance away from the stationary half die.

Another object of the invention is to provide an injection molding or die casting machine which comprises a greatly reduced number of component parts and in which a single component part participates in the application of die closing and die sealing pressures.

A further object of the invention is to provide a machine of the above outlined characteristics which utilizes a movable platen of much lighter design than in conventional injection molding and die casting machines of which I have knowledge at this time, which requires small quantities of a pressure fluid for the generation of die closing and die sealing pressures and movements, and whose overall length remains the same regardless of whether the die assembly is in open or closed position.

Still another object of the invention is to provide an improved die closing, locking and sealing arrangement for injection molding and die casting machines.

A concomitant object of the invention is to provide a machine of the above outlined characteristics which may be readily adjusted for the production of differently dimensioned shaped articles.

An additional object of the invention is to provide an improved mechanical locking assembly for die casting and injection molding machines.

A further object of the instant invention is to provide a machine of the above described type in which the connection between the stationary components and the movable platen remains sufficiently rigid even if the machine is utilized for the production of comparatively small shaped articles when the movable platen must be moved to a position at a considerable distance from the support for the die closing assembly.

With the above objects in view, one feature of the invention resides in the provision of a machine which may be utilized for injection molding of synthetic thermoplastic materials or for casting of metallic materials, and which comprises two spaced stationary supports the first of which supports a first pressure member including a stationary half die and the second of which supports the die closing assembly, a second pressure member which is mounted for movements along guiding members provided between the two stationary supports and which includes a movable half die, a die closing piston-cylinder assembly whose double-acting cylinder, contrary to the construction of conventional machines, is shiftably mounted in the second stationary support and is operatively connected to the movable pressure member. The improved machine further comprises a die sealing piston-cylinder assembly whose elements are respectively connected with the cylinder of the die closing assembly and with the movable pressure member so that a sealing pressure may be applied to the movable half die after the latter is moved by the die closing cylinder into abutment with the stationary half die. In order to prevent transmission of excessive stresses to the comparatively weak die closing assembly, the machine preferably comprises a mechanical locking assembly which, in accordance with my invention, may include one or more locking members adapted to be moved into engagement and preferably into abutment with the rear end face of the die closing cylinder when the latter shifts the movable half die into operative position, these locking members being reciprocable by double-acting hydraulic or pneumatic piston-cylinder assemblies to move substantially radially toward or away from the die closing cylinder.

Another important feature of the invention resides in the provision of means which permits adjustments of the movable pressure member with respect to the second stationary support so that the machine may be readily converted for production of differently dimensioned shaped articles or for use in connection with differently dimensioned dies.

In its preferred form, the improved machine comprises a substantially cup-shaped housing rotatably and axially movably mounted in the second stationary support. The housing has an open end which is turned toward the movable pressure member and which receives the die closing cylinder for axial movements with the movable half die toward and away from the stationary half die. The housing also mounts the mechanical locking assembly and is rigidly connected with the stationary piston of the die closing means, and more particularly with the rod of this piston.

An important advantage of the feature that the die closing cylinder is shiftable with respect to the stationary piston is that a cylindrical body is much less likely to buckle in response to substantial axial stresses than a piston rod and also that the cylinder need not extend rearwardly and beyond its support when it shifts the movable half die away from the mating stationary half die.

The novel features which are considered as characteristic of the invention are set forth in particular in the appended claims. The machine itself, however, both as to its construction and its method of operation, together with additional features and advantages thereof, will be best understood from the following detailed description of two specific embodiments with reference to the accompanying drawings, in which:

FIG. 1 is an axial section through an injection molding machine with the die means in open position;

FIG. 2 is a similar section through the machine with the die means in closed position;

FIG. 3 is a further axial section through the machine showing its parts in positions they assume when the movable half die subjected to hydraulic sealing pressure;

FIG. 4 is a fragmentary axial section through a modified machine in which the die closing cylinder is integral with the die sealing cylinder element.

Figure 5:
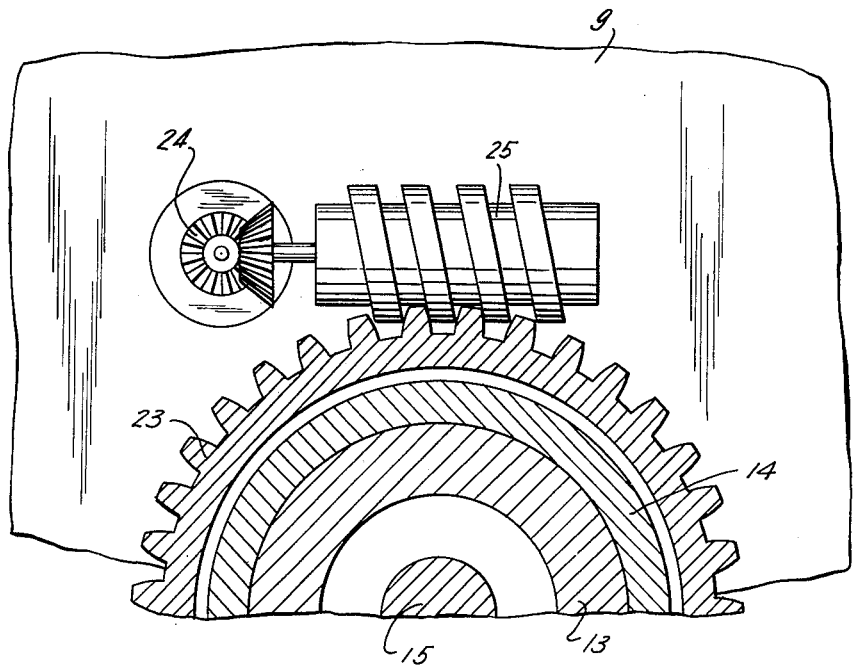
FIG. 5 is a fragmentary transverse section through a portion of the structure shown in FIGS. 1 to 3.

Referring now in greater detail to the illustrated embodiments, and first to FIG. 1, there is shown an injection molding machine 1 which is assumed to be utilized for the production of shaped articles consisting of synthetic thermoplastic material. The machine 1 comprises a die closing assembly which is adapted to rapidly shift a first pressure member including a movable half die 12 toward and away from a stationary second pressure member here shown as a half die 7, a material injecting assembly 2, a mechanical locking assembly 29–34, and a hydraulic die sealing assembly 26–38. At least the die closing and material injecting assemblies are mounted on a common machine base or bed 3.

When the machine is utilized for the production of shaped articles consisting of synthetic plastic material the injecting assembly 2 must transform a granular substance into a plastic mass and thereupon ejects the mass through the discharge orifice of a nozzle 4 into the mold cavity defined by the half dies 7, 12 which latter together constitute a composite die means 8. The material injecting assembly 2 further comprises a cylindrical member 5 which is electrically heated by means not shown in the drawings and which accommodates a screw conveyor 5a. The conveyor 5a is rotatably and axially shiftably mounted in the cylindrical member 5, and its purpose is to advance and to thoroughly knead the granular material so that the material is transformed into a plastic mass, partially by internal friction and partially by the action of heat radiated by the means installed in the cylindrical member 5. The plastic mass accumulates in a compartment at the forward end of the cylindrical member 5 and, when the compartment is filled, the mass is ejected through the discharge orifice of the nozzle 4 by shifting the screw conveyor 5a axially in the cylindrical member. The entire material injecting assembly 2 is mounted on the machine base 3 and may be shifted axially toward and away from the composite die 8 by means of a suitable piston-cylinder arrangement, not shown in the drawings.

The die closing assembly comprises an upright stationary die support or platen 6 of rectangular shape which is mounted on the machine base 3 adjacent to the material injecting assembly 2. This stationary platen 6 supports the stationary half die 7 which is bolted or otherwise rigidly secured thereto. The left-hand end portion of the machine base 3 supports a second stationary support or crosshead 9 which, too, is preferably of rectangular shape and is connected with the stationary platen 6 by four horizontal guiding members in the form of parallel tie rods 10 only two of which are shown in the drawings. Each tie rod connects two aligned corner portions of the spaced stationary supports 6 and 9. The tie rods 10 slidably guide a movable die support 11 (hereinafter called movable platen) which mounts the movable half die 12. The half die 12 and the movable platen 11 together constitute a movable pressure member. The movable platen 11 is operatively connected with and is shiftable along the tie rods 10 by means of double-acting hydraulic cylinder 13 which is slidably mounted in a cupped housing 14 carried by the crosshead 9. The cylinder 13 is also slidable with respect to a piston 16 whose piston rod 15 extends rearwardly through the open end of the cylinder and is secured to the bottom wall of the housing 14 by means of a nut 20. The open rear end of the cylinder 13 is sealed by an annular plug 18 which is coaxially guided along the piston rod 15 when the cylinder 13 is shifted axially with respect to the cupped housing 14. The plug 18 is separable from the cylinder 13 to permit withdrawal of the piston 16, the latter dividing the internal space of the cylinder 13 into a front cylinder chamber 22 and a rear cylinder chamber 21, the hydraulic pressure fluid being alternately supplied to and evacuated from these cylinder chambers through two bores or channels 17, 19, both provided in and extending longitudinally within the piston rod 15. The hydraulic system which supplies pressure fluid to the chambers 21, 22 is shown only schematically because its construction forms no part of my invention. This system comprises a source of pressure fluid, e.g., an oil reservoir 35, and a supply conduit 36 which contains a hydraulic pump 37 adapted to deliver fluid to a two-way valve 38. This valve is respectively connected with the channels 19, 17 by conduits 39, 40 and a return conduit 41 connects the valve 38 with the reservoir 35. A pressure relief valve 42 is installed in the supply conduit 36 between the pressure side of the pump 37 and the two-way valve 38; this pressure relief valve is connected with the reservoir 35 by an overflow conduit 43.

When the operator desires to move the half die 12 from the operative position of FIG. 2 into the inoperative position which is illustrated in FIG. 1, he adjusts the two-way valve 38 in such a manner that pressure fluid delivered by the pump 37 flows through the conduit 39 and through the channel 19 into the rear cylinder chamber 21 whereby the fluid acts against the left-hand side of the piston 16 and against the right-hand side of the plug 18 to shift the die closing cylinder 13 in a direction to the left until the left-hand end face of the cylinder comes into abutment with the bottom wall of the cupped housing 14. At the same time, the valve 38 permits fluid contained in the chamber 22 to flow through the channel 17, through the conduit 40, and through the return conduit 41. The position of the valve 38 is reversed when the operator desires to move the cylinder 13 into the operative position of FIG. 2 in order to close the composite die means 8, i.e., the fluid then flows into the front cylinder chamber 22 and is simultaneously discharged from the rear cylinder chamber 21.

The housing 14 is provided with external threads meshing with internal threads of a tubular member or sleeve 23 which is rotatably mounted in the crosshead 9. The sleeve 23 is rotatable in but cannot be shifted in the axial direction of the crosshead. The means for rotating the sleeve 23 comprises an electric motor 24 which is preferably mounted on the crosshead 9, and a worm drive 25, the rotation of sleeve 23 resulting in axial displacements of the die closing cylinder 13, of the movable platen 11 and of the housing 14. The sleeve 23, the motor 24 and the worm drive 25 are shown in greater detail in FIG. 5 and constitute an adjusting means which enables an operator to vary the distance between the crosshead 9 and the movable platen 11 in dependency on the axial length of the composite die means 8. This will be readily understood upon an observation of FIG. 2, i.e., if the axial length of a newly inserted composite die means is less than the combined axial length of the half dies 7 and 12, the operator will start the motor 24 and will rotate the sleeve 23 in such direction that the housing 14 is axially shifted in a direction to the right and toward the stationary platen 6. In other words, the means 23–25 allows for axial adjustments of the movable platen 11 with respect to the stationary platen 6 even if the closing cylinder remains in one of its end positions. Furthermore, since the axial length of the externally threaded housing 14 exceeds the axial length of the crosshead 9, the number of interengaging threads between the housing and the sleeve 23 remains the same regardless of the momentary axial position of the housing with respect to the crosshead. This is of considerable advantage because the threads between the housing 14 and the sleeve 23 transmit to the crosshead considerable stresses in the course of a molding or casting operation. Such arrangement constitutes an improvement over certain prior constructions which utilize threaded spindles and in which the threaded connection between the spindle and the stationary part of the molding machine is weakened when the machine utilizes a small die so that the movable platen must be shifted into very close proximity of the stationary platen.

The right-hand end of the cylinder 13, as viewed in FIGS. 1–3, is enlarged to constitute a large-diameter piston element 26. This piston element is received in a comparatively short cylinder element 27 which is preferably integral with and which extends rearwardly from the movable platen 11. The die sealing piston-cylinder assembly 26, 27 is utilized for applying a sealing pressure to the movable platen 11 and hence to the movable half die 12 during actual injection of material into the mold cavity defined by the composite die means 8 to thereby prevent flashing of injected material during the molding or casting operation. The movable plate 11 and the cylinder element 27 may be formed as an integral casting. Since the cylinder element 27 is not formed in but rather on the movable platen, the latter's axial length is comparatively small particularly if compared with certain two-piece movable platens of known design. In order to insure that the die closing cylinder 13 will entrain the movable platen 11 in a direction away from the stationary platen 6, the open rear end of the cylinder element 27 is connected with an annular abutment member 28 secured thereto by a number of bolts or the like, this abutment member being engaged by the annular flange of the piston element 26 when the valve 38 permits pressure fluid to flow into the rear cylinder chamber 21. Since the pressures prevailing in the die means 8 are often very high, the diameter of the piston element 26 is rather large, i.e., it exceeds substantially the diameter of the piston 16.

The cylinder 13, the piston 16 and the piston rod 15 of the die closing assembly are coaxial with the cylinder element 27 and the piston element 26 of the die sealing assembly so that these parts have a common longitudinal axis X. The axis X is preferably also the common axis of the stationary platen 6, of the movable platen 11 and of the crosshead 9 together with the sleeve 23 and the housing 14. Such arrangement insures that the closing forces are symmetrical with respect to the common longitudinal axis X and that the whole machine and especially the movable platen 11 is not subjected to tilting or overturning stresses.

It will be noted that the effective diameter of the die closing piston-cylinder assembly 13, 16 is comparatively small and, therefore, this assembly by itself could not withstand pressures which arise during a molding or casting operation. On the other hand, it is of considerable advantage to utilize a small-diameter die closing assembly because the cylinder 13 may be shifted very rapidly and requires small quantities of hydraulic fluid. In order to positively hold the die closing cylinder 13 in the position of FIG. 2, the machine further comprises a mechanical locking assembly including one, two or more arcuate, preferably sickle-shaped locking members or stops 29. The drawings show two diametrically opposed locking members 29 which are movable radially toward and away from the closing cylinder 13 and are mounted on the housing 14. At a point close to its open forward end, the housing 14 is provided with suitable radial openings 30 which permit reciprocatory movements of the locking members 29 in the radial direction of the cylinder 13 and whose walls simultaneously guide the locking members during such movements. The locking members 29 are reciprocable by comparatively small double-acting hydraulic or pneumatic piston-cylinder assemblies 33, 32 which are mounted on an annular flange 31 forming part of the cupped housing 14. The pistons 33 are connected with the respective locking members 29 by piston rods 34. As can be observed in FIG. 3, the piston rods 34 may move the locking members 29 into abutment with the rear end face of the closing cylinder 13 when the latter is in the extreme right-hand or die closing position so as to prevent any movements of the cylinder 13 in a direction to the left when the injection molding operation takes place. All stresses arising during the molding operation are taken up by the stationary platen 6, by the stationary crosshead 9, and by the non-compressible hydraulic fluid filling the chamber 44 in the cylinder element 27. Owing to their arcuate shape, the locking members are formed with large end faces which engage with the walls of the respective openings 30 in the flange 31 and with the rear end face of the die closing cylinder 13 to securely hold the latter in die closing position. Thus, the lightweight locking members 29 may safely replace the bulky spacer bars and Maltese cross-shaped plates which constitute the locking means in known injection molding and die casting machines. The housing 14 and the parts 23–25 actually constitute a means for moving the locking means 29–34 and the piston 16 in the axial direction of and with respect to the cylinder 13.

The hydraulic supply and control system for the die sealing piston-cylinder assembly 26, 27 and for the locking piston-cylinder assemblies 33, 32 forms no part of my invention and, therefore, is not illustrated in detail in the drawing. As shown, the cylinder chamber 44 may receive and discharge pressure fluid through a channel 45. The entire operation may be carried out in a fully automatic way, for example, by providing a system of suitable pumps, electromagnetic valves, time switches and limit switches which regulate the flow of fluid to and from the various piston-cylinder assemblies in a predetermined sequence. As shown in FIG. 1, the first operating step may consist in axial displacement of the movable platen 11 in a direction away from the stationary platen 6 to separate the half dies 7, 12 and to permit ejection of the molded article from the mold cavity. As explained hereinabove, such movement is brought about by pressure fluid flowing through the channel 19 and into the rear cylinder chamber 21. It will be noted that, despite its compactness, i.e., its comparatively small axial length, the machine permits the platen 11 to perform long strokes and to move to a position at a considerable distance from the stationary platen 6 so that the molded article may be withdrawn in a very convenient manner and also that the machine may be utilized for the production of comparatively large molded articles. This is due to the fact that the closing cylinder 13 is not mounted at the rear or left-hand side of the crosshead 9 but is movable with the platen 11 toward and away from the stationary platen 6. As shown in FIG. 1, the cylinder 13 may be nearly completely retracted into the crosshead 9. Also, since the cylinder 13 and the piston element 26 form a one-piece structure, the entire machine is more compact because of additional reduction in its axial length.

In the next step, the position of the valve 38 is reversed so that the die closing cylinder 13 is shifted to assume the position of FIG. 2 and thereby moves the half die 12 into abutment with the stationary half die 7. The rear end face of the cylinder 13 is then moved beyond the openings 30 so that the locking members 29 may be moved radially inwardly (see FIG. 3) to engage with this cylinder and to prevent it from yielding to high pressures which arise during the molding or casting operation. In the next step, pressure fluid is introduced into the cylinder chamber 44 to seal the die means 8 and to prevent flashing during the molding or casting operation. Thus, the die sealing piston-cylinder assembly 26, 27 serves as a means for airtightly sealing the die means 8. The injecting operation is then carried out in the usual manner, i.e., the injecting assembly 2 is axially shifted in the direction indicated by the arrow 46 so that the nozzle 4 enters the cutout 47 formed in the stationary platen 6 and moves its discharge end into sealing abutment with the wall surrounding the injecting channel 48 in the half die 7 which leads to the mold cavity. The screw conveyor 5a then injects the plasticized material while the mechanical locking members 29 and the hydraulic fluid in the chamber 44 retain the movable half die 12 in sealing abutment with the stationary half die 7.

FIG. 4 illustrates a slight modification of my invention according to which the die closing cylinder 13' is integrally formed with or is rigidly connected to the die sealing cylinder element 27'. The die sealing piston element 26' is integral with or is rigidly connected to the movable platen 11' and is retained in the cylinder element 27' by an annular member 28' which is fixed to the open forward end of the cylinder element. The sealing chamber 44' may be filled with pressure fluid flowing through a channel 45' which is provided in the movable platen 11'. Otherwise, the construction of this modified machine is identical with the construction of the machine 1 shown in FIGS. 1 to 3.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a machine of the character described, in combination, a first stationary support and a second stationary support, said supports being spaced from each other; elongated guiding members extending between and having ends secured to said supports; a first pressure member supported by said first support and directed toward said second support; a second pressure member mounted on said guiding members and movable between an inoperative position in which it is spaced from said first pressure member and an operative position in which it is located adjacent said first pressure member; a piston mounted on said second support and directed toward said first support; a cylinder slidably mounted on said second support, said cylinder enclosing said piston and cooperating therewith so that upon admission of pressure fluid into said cylinder the cylinder is moved in a direction toward said first support; a piston element and a cylinder element, said cylinder element enclosing said piston element, one of said elements being firmly secured to said cylinder and the other of said elements being firmly secured to said second pressure member; locking means mounted on said second support and adapted to prevent return movement of said cylinder when the cylinder has moved in a direction toward said first support; and fluid admitting means for admitting pressure fluid into said cylinder element so as to move said other element and said second pressure member into said operative position thereof.

2. A combination as set forth in claim 1, further comprising moving means for shifting said locking means with respect to said second support and in the axial direction of said cylinder.

3. A combination as set forth in claim 2, wherein said piston is rigidly fixed to and is shiftable by said moving means with respect to and in the axial direction of said cylinder.

4. In an injection molding machine, in combination, a base; a stationary platen rigidly fixed to said base; a stationary crosshead rigidly fixed to said base and spaced from said stationary platen; a plurality of parallel tie rods extending between and connected with said crosshead and with said stationary platen; a movable platen traversed by and slidable along said tie rods toward and away from said stationary platen; die means disposed between said platen, said die means comprising a first half die connected with said stationary platen and a second half die connected with said movable platen, said half dies respectively engaging with and being spaced from each other when the movable platen is respectively moved toward and away from said stationary platen; a substantially cup-shaped housing mounted in said crosshead and having an open end turned toward said movable platen, said housing being provided with radial opening means adjacent to said open end; die closing means comprising a cylinder slidably received in said housing and a piston received in said cylinder and fixed to said housing, said cylinder having an end face movable beyond said opening means when the cylinder is shifted in a direction to move the movable platen toward said stationary platen and to move the second half die into engagement with the first half die; die locking means comprising at least one locking member reciprocable through said opening means and engageable with the end face of said cylinder, and means for reciprocating said locking member; and die sealing means comprising a cylinder element and a piston element which latter is reciprocable in said cylinder element, one of said elements being rigid with said movable platen and the other element being rigid with said first mentioned cylinder.

5. In an injection molding machine, in combination, a base; a stationary platen rigidly fixed to said base; a stationary crosshead rigidly fixed to said base and spaced from said stationary platen; a plurality of parallel tie rods extending between and connected with said crosshead and with said stationary platen; a movable platen traversed by and slidable along said tie rods toward and away from said stationary platen; die means disposed between said platens, said die means comprising a first half die connected with said stationary platen and a second half die connected with said movable platen, said half dies respectively engaging with and being spaced from each other when the movable platen is respectively moved toward and away from said stationary platen; a substantially cup-shaped housing mounted in said crosshead and having an open end turned toward said movable platen, said housing being provided with radial opening means adjacent to said open end; die closing means comprising a cylinder slidably received in said housing and a piston received in said cylinder and fixed to said housing; die locking means comprising at least one locking member reciprocable through said opening means and engageable with said cylinder, and means for reciprocating said locking member; and die sealing means comprising a cylinder element and a piston element which latter is reciprocable in said cylinder element, one of said elements being rigid with said movable platen and the other element being rigid with said first mentioned cylinder.

6. In an injection molding machine, in combination, a base; a stationary platen rigidly fixed to said base; a stationary crosshead rigidly fixed to said base and spaced from said stationary platen; a plurality of parallel tie rods extending between and connected with said crosshead and with said stationary platen; a movable platen traversed by and slidable along said tie rods toward and away from said stationary platen; die means disposed between said platens, said die means comprising a first half die connected with said stationary platen and a second half die connected with said movable platen, said half dies respectively engaging with and being spaced from each other when the movable platen is respectively moved toward and away from said stationary platen; a substantially cup-shaped housing mounted in said crosshead and having an open end turned toward said movable platen, said housing being provided with two diametrically opposed openings adjacent to said open end; die closing means comprising a tubular cylinder slidably received in said housing and a piston received in said cylinder and having a piston rod fixed to said housing, said cylinder having an end face movable beyond said openings when the cylinder is shifted in a direction to shift the movable platen toward said stationary platen and to move the second half die into engagement with the first half die; die locking means comprising two arcuate locking members each reciprocable through one of said openings and engageable with the end face of said cylinder to prevent movements of the cylinder in a direction away from said stationary platen, and fluid-operated piston-cylinder means for reciprocating said locking members; and die sealing means comprising a cylinder element and a piston element which latter is reciprocable in said cylinder element, one of said elements being rigid with said movable platen and the other element being rigid with said first mentioned cylinder.

References Cited in the file of this patent

UNITED STATES PATENTS

| | | |
|---|---|---|
| 2,273,713 | Lawyer | Feb. 17, 1942 |
| 2,498,264 | Goldhard | Feb. 21, 1950 |
| 2,618,823 | Perkon | Nov. 25, 1952 |
| 2,627,630 | Farley | Feb. 10, 1953 |
| 2,680,883 | Ashbough | June 15, 1954 |

FOREIGN PATENTS

| | | |
|---|---|---|
| 786,248 | Great Britain | Nov. 13, 1957 |